United States Patent [19]

Toivio

[11] Patent Number: 5,067,534
[45] Date of Patent: Nov. 26, 1991

[54] SPINDLE DRIVE FOR A VENEER LATHE

[75] Inventor: Juha Toivio, Lahti, Finland

[73] Assignee: Raute Oy, Lahti, Finland

[21] Appl. No.: 601,699

[22] PCT Filed: Apr. 10, 1989

[86] PCT No.: PCT/FI89/00065
§ 371 Date: Oct. 31, 1990
§ 102(e) Date: Oct. 31, 1990

[87] PCT Pub. No.: WO89/12535
PCT Pub. Date: Dec. 28, 1989

[30] Foreign Application Priority Data

Jun. 20, 1988 [FI] Finland .................. 882937

[51] Int. Cl.[5] .................................. B27L 5/02
[52] U.S. Cl. .................. 144/209 R; 82/17;
82/148; 91/32; 91/420; 144/209 A
[58] Field of Search ............... 91/32, 420; 82/17, 148;
144/209 R, 209 A

[56] References Cited

U.S. PATENT DOCUMENTS

| | | | |
|---|---|---|---|
| 1,841,544 | 1/1932 | Merritt | 144/209 R |
| 2,340,532 | 2/1944 | Jackson | 144/209 R |
| 2,501,387 | 3/1950 | Haumann | 144/209 R |
| 4,378,827 | 4/1983 | Shrum et al. | 144/209 A |

Primary Examiner—W. Donald Bray
Attorney, Agent, or Firm—Armstrong, Nikaido, Marmelstein, Kubovcik & Murray

[57] ABSTRACT

The invention concerns a spindle drive for a veneer lathe. In view of reducing the mobile masses of the drive gear equipment making the lathe better adaptable to different log lengths, the opposite spindles in the lathe are provided with drive motors of their own. In the preferred embodiment, the rotor of the motor is mounted directly on the spindle and the stator is mounted on a frame unit displaceable on guides. The motor may be an electric motor provided with speed regulation, or it may be a hydraulic motor.

5 Claims, 1 Drawing Sheet

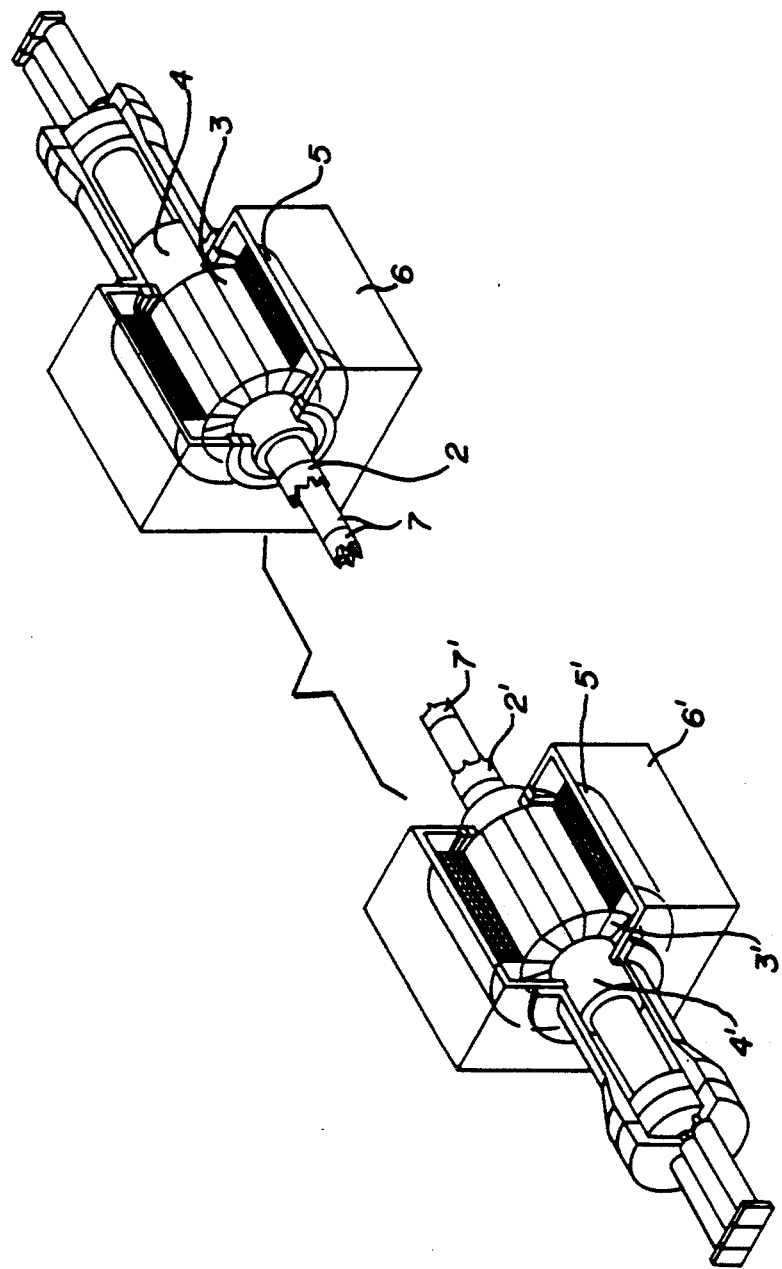

SPINDLE DRIVE FOR A VENEER LATHE

The invention concerns a spindle drive for a veneer lathe.

In order to drive the spindle of a veneer lathe, usually an electric motor is used which transfers the rotating power to the spindles through a reduction gear and a chain transmission. It is also common practice to employ only one power source per lathe, fitted at the proximity of one end of the lathe. The rotating power is transferred to the other spindle through a transmission shaft, a chain drive and/or a set of cogwheels.

It is a direct consequence of the above-described construction used that the overall construction is massive, both in terms of the static components used in the apparatus as well as the revolving components used therein. Also, the construction is strictly bound to predetermined operational dimensions that have been chosen, wherein adaptation to different log lengths is possible only within the scope of the ordinary axial movement of the spindles, i.e. the spindle stroke.

However, in practice, the nominal dimensions of the logs to be turned vary starting from a log length of 950 mm, whereas a usual upper limit of a log length is 2750 mm. Log lengths higher than 3000 mm also occur. Within the scope of the spindle stroke, the lathe can, however, be adapted within considerably narrower limits, whereby, in the dimensioning of the lathe, the nominal dimension of the log to be turned must be taken into account. This circumstance can be considered to be quite a restrictive factor.

The primary object of the present invention is to simplify the rotation drive equipment of the spindles and to make them such that they require less maintenance, respond to operation commands more rapidly (i.e. enable smaller mobile masses). and are less noisy in operation. At the same time the construction of the whole lathe becomes simpler, and possibilities are obtained for the use of modular constructions.

In this way, possibilities are also obtained for adaptation of the veneer lathe to a larger variation in the log length than what is possible within the scope of the grasping stroke of the spindles, i.e. the so-called spindle stroke.

Further, displacement of the spindles in a plane perpendicular to the spindle axis is permitted, which enables the possibility of providing the lathe with several operational applications, such as, for example, the possibility to operate with two different knife settings.

The main object can be achieved in accordance with the invention by means of a lathe which comprises spindles or spindle pairs directed one opposite the other and receiving power of rotation at each end of the lathe, wherein the spindles or spindle pairs can be displaced within the scope of the spindle stroke axially in opposite directions in relation to one another so as to grasp the log to be turned, according to the primary characteristic of the invention, so that the spindles or spindle pairs are provided with drive motors of their own at each end of the lathe to produce the power of rotation.

The other characteristics of the invention are apparent from the accompanying patent claims.

The invention will be described with the aid of the accompanying drawing illustration, wherein the log rotating spindles and their drives are shown in a reduced scale.

In the embodiment shown, the spindles consist, in the conventional way, of two spindle pairs 1,2 and 1',2', each pair comprising spindles of different diameters which can be displaced in relation to one another telescopically in a manner known in prior art. Each of the spindles is mounted on an end frame 6,6' of its own. In the embodiment shown, the electric motors that operate the spindles are mounted so that the rotor of the motor is mounted directly on the spindle shaft 4,4', and the stator is mounted on the end frame 6,6'. Thus, in this embodiment, the spindles, the drive motor and the end frame can be formed as a whole unit.

In the simplest embodiment, such a unit can be mounted in a lathe on guides parallel to the spindle axes to operate jointly with an opposite, stationary spindle arrangement, which may be provided with a traditional drive. Such a construction permits ready adaptation of the lathe to different log lengths. A more natural construction can, however, be produced if each of said spindle arrangements is composed of said whole units, each of which is mounted on the lathe as displaceable in the direction of the spindle axes.

Further, two opposite units may be mounted in the lathe construction as also displaceable in planes perpendicular to the spindle axes. By means of this arrangement, for example operation of the lathe with two knife settings is permitted. In such a case, the knife settings may be placed, at different levels, in which case a certain knife setting is intended for peeling the veneer in a certain direction of rotation of the log, whereas the other knife setting is intended for peeling the veneer in the opposite direction of rotation of the log. Thus, by means of the lathe, it is possible to feed two veneer treatment devices, and, moreover, the veneers peeled by such devices may have different widths compared with one another.

For the drive motor, advantageously a squirrel-cage motor constructed for this purpose is used. For peeling of the veneer, the motor must be provided with means for regulating the speed of rotation, which can be accomplished by means of regulating frequency in the case of a squirrel-cage motor. The maximum speed of rotation of the motor may be about 600 rpm. The construction described above can also be used in the rounding-turning process that precedes the peeling of the veneer, in which case the motor may have a constant speed of rotation, e.g. 300 or 375 rpm.

In the peeling of the veneer, for each spindle unit a motor is needed whose power is about 90 to 120 kW. Such a power requires efficient cooling of the motor, which can be accomplished, for example by oil cooling. These details, which are obvious for a person skilled in the art, are not illustrated in the accompanying drawing.

Another possibility to accomplish the invention is to make use of a hydraulic drive. In such a case, the hydraulic motor is mounted advantageously, in accordance with the electric drive illustrated in the figure, on the spindles of the lathe. For the motor, in particular a radial-piston motor can be provided, whose cam ring is mounted on the shaft of the spindle, in a manner corresponding to the rotor of the electric motor. On the other hand, the cylinder group of the motor is mounted on the end frame. A pump unit which produces an operating pressure can be accomplished as a unit common with both motors, even though separate pump units for each motor are not excluded from the embodiments of the invention.

Differing from the embodiments described above, the basic idea of the invention may also be accomplished by means employing a a more traditional technique of drive gear, i.e. by providing the spindles at each end of the lathe with drive motors of their own, from which power of rotation is passed to the spindles by means of a gearbox and a chain transmission. In such a construction, if the spindle unit at one end of the lathe is constructed as a unit that comprises the spindles, the drive and the end frame, and that is displaceable on guides parallel to the spindle shafts, the lathe can be easily adapted to varying log lengths.

By means of the construction described above, several advantages of the embodiment illustrated in the drawings, which were referred to above, can, however, not be obtained.

I claim:

1. A veneer lathe comprising:
   first spindle means comprising a first spindle shaft and first grasping means for grasping one end of a log to be turned about a longitudinal axis of said lathe, said first spindle means being displaceable along said longitudinal axis to grasp said log;
   second spindle means disposed opposite to said first spindle means along said longitudinal axis, said second spindle means comprising a second spindle shaft and second grasping means for grasping another end of said log opposite said one end, said second spindle means being displaceable along said longitudinal axis to grasp said log;
   drive means for rotating at least one of said first or second spindle means about said longitudinal axis, said drive means comprising rotor means mounted on at least one of said first or second spindle shafts and stator means disposed in a frame around said rotor means.

2. A veneer lathe according to claim 1 wherein said drive means comprises an AC motor and means for adjusting the frequency of said AC motor.

3. A veneer lathe according to claim 1, wherein said drive means comprises a DC motor and means for adjusting the speed of said DC motor.

4. A veneer lathe according to claim 1, wherein said drive means comprises a hydraulic motor, said rotor means comprises a cam ring mounted on at least one of said first and second spindle shaft, and said stator means comprises a plurality of cylinders mounted around said cam ring.

5. A veneer lathe according to claim 1, wherein said drive means comprises:
   first drive means for rotating said first spindle means about said longitudinal axis, said first drive means comprising first rotor means mounted on said first rotor shaft and first stator means disposed in a frame around said first rotor means; and
   second drive means for rotating said second spindle means about said longitudinal axis, said second drive means comprising second rotor means mounted on said second spindle shaft and second stator means disposed in a frame around said second rotor means.

* * * * *